D. TURNER.
HAND OPERATED COMPUTING ATTACHMENT.
APPLICATION FILED JULY 31, 1919.

1,359,549.

Patented Nov. 23, 1920.
3 SHEETS—SHEET 1.

INVENTOR
Douglas Turner.
By Elliott & Ammen
his ATTORNEYS

D. TURNER.
HAND OPERATED COMPUTING ATTACHMENT.
APPLICATION FILED JULY 31, 1919.

1,359,549.

Patented Nov. 23, 1920.
3 SHEETS—SHEET 2.

INVENTOR
Douglas Turner
By Elliott V Ammen
his ATTORNEYS

D. TURNER.
HAND OPERATED COMPUTING ATTACHMENT.
APPLICATION FILED JULY 31, 1919.

1,359,549.

Patented Nov. 23, 1920.
3 SHEETS—SHEET 3.

INVENTOR
Douglas Turner.
by
his ATTORNEYS.

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF MISSOURI.

HAND-OPERATED COMPUTING ATTACHMENT.

1,359,549.  Specification of Letters Patent.  Patented Nov. 23, 1920.

Application filed July 31, 1919. Serial No. 314,456.

*To all whom it may concern:*

Be it known that I, DOUGLAS TURNER, a citizen of the United States, residing in the city of St. Louis and State of Missouri, have invented new and useful Improvements in Hand - Operated Computing Attachments, of which the following is a specification.

This invention relates to machines which embody indicating mechanism. The invention is applicable to a machine of any type in which indicating mechanism is normally advanced by one means, but in which it is desirable at times to advance the indicating mechanism by other means instead of in the regular manner. The invention is very useful as a computer attachment for fabric measuring and cost computing machines, used largely in retail houses, because it enables the charge for the goods to be readily ascertained before measuring the same if the customer wishes to know the charge in advance.

The general object of the invention is to provide an indicating machine with means for readily advancing the indicating mechanism when desired, by manually operated means. As applied to a fabric measuring and cost computing machine, the invention enables the salesman to inform the customer, without delay, as to the charge to be made for the fabric that is to be purchased. One of the objects of the invention has been to render the manually operated means automatically connected to and disconnected from the indicating mechanism, the automatic operation being such as to effect the automatic connection of the manually operated means to the indicating mechanism when the mechanism is not set for measuring fabric. To state this more specifically, as applied to a fabric measuring machine, I control the connection of the manually operated means to the indicating mechanism, through the agency of some part of the machine, for example, the presser-roller which coöperates with the measuring-roller of the machine, that is to say, when the presser-roller is withdrawn from the measuring-roller as it is when the machine is not measuring, the hand-operated means is automatically connected to the indicating mechanism and vice versa. Another object of the invention is to utilize the measuring roller as a balance-wheel or fly-wheel to steady the operation of the indicating mechanism when being advanced by the hand operated means.

Further objects of the invention will appear hereinafter.

The invention consists in the novel features, and in the general combination of parts to be particularly described hereinafter. all of which contribute to produce a simple and efficient hand actuated calculator attachment. A preferred embodiment of my invention will be particularly described in the following specification, while the broad scope of my invention will be pointed out in the appended claims.

Figure 1:
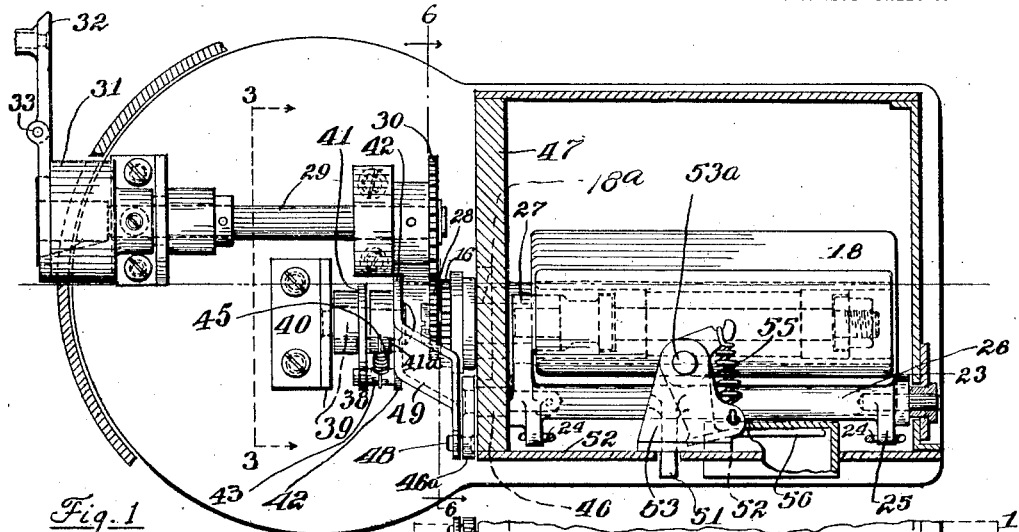
Figure 1 is a horizontal section taken about on the line 1—1 of Fig. 2 passing through a machine embodying my invention, certain parts being broken away.
Figure 2:
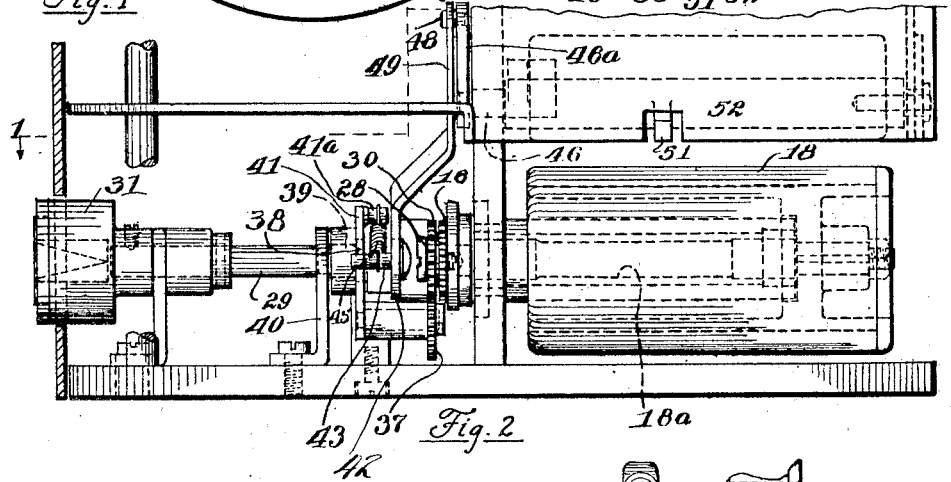
Fig. 2 is a side elevation and partial section of the mechanism shown in Fig. 1.
Figures 3, 4, 4A:
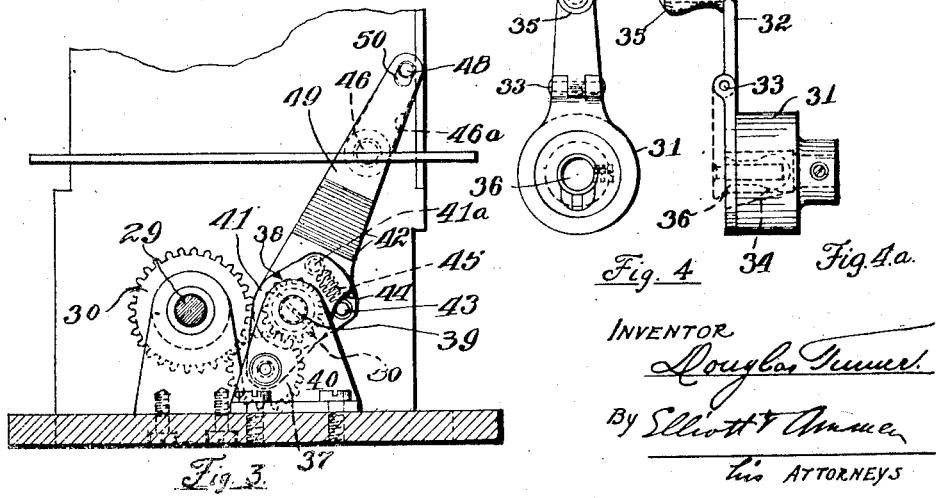
Fig. 3 is a cross-section taken about on the line 3—3 of Fig. 1.
Fig. 4 is a detail, and is an end elevation of the parts of the hand-actuated means.
Figure 5:
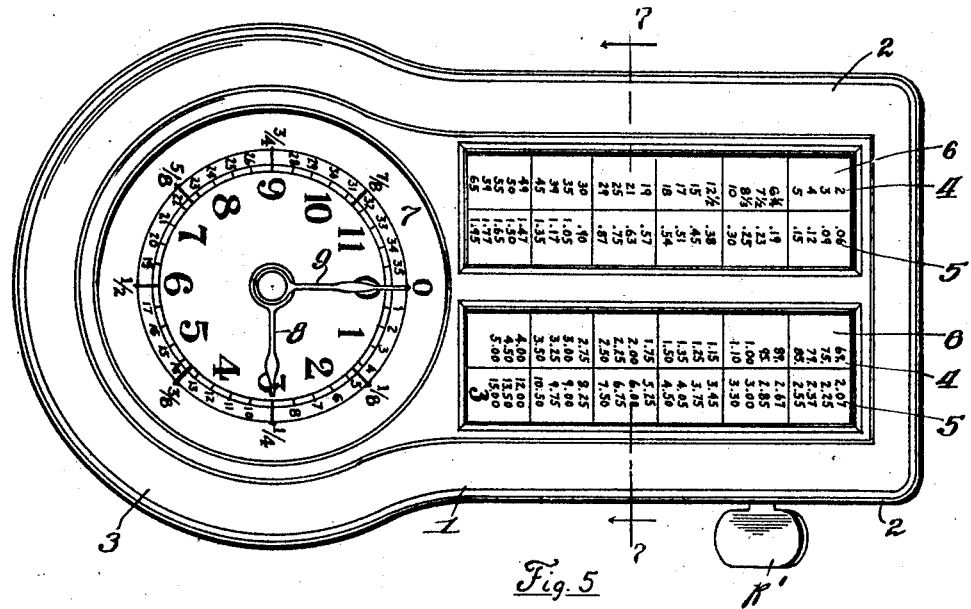
Figure 6:
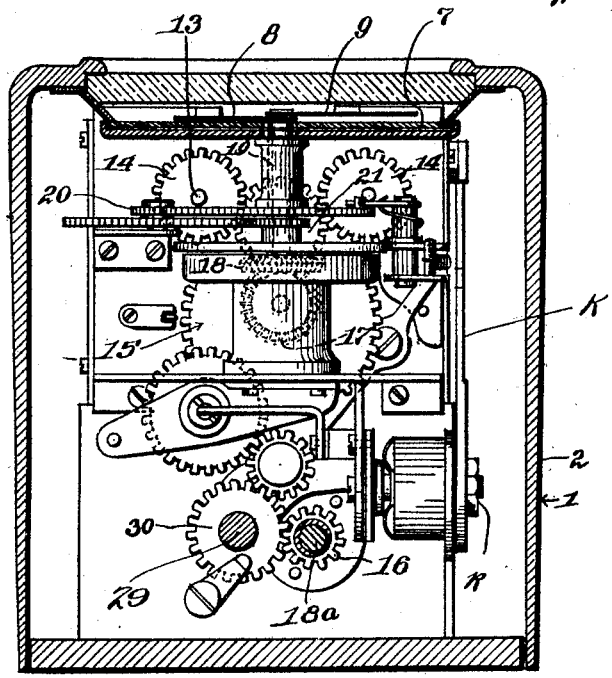
Figure 7:
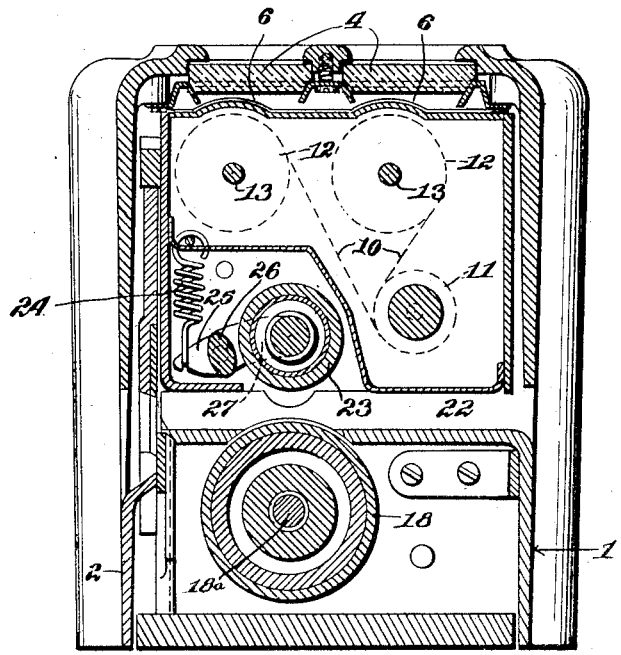
Figure 8:
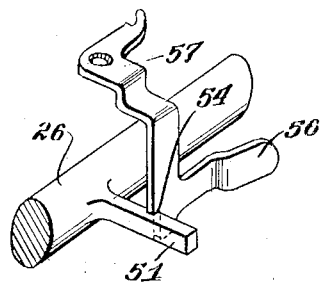

Fig. 4ᵃ is a side elevation of the parts shown in Fig. 4;

Fig. 5 is a plan of the complete machine;

Fig. 6 is a vertical cross-section through the machine, the upper part of which passes through the center of the dial, the lower part of the view being a section taken about on the line 6—6 of Fig. 1;

Fig. 7 is a vertical cross-section taken about on the line 7—7 of Fig. 5 through the machine, particularly illustrating the relation of the presser-roller and the measuring-roller; and Fig. 8 is a perspective showing details of the means for controlling the presser-roller.

The machine to which I have applied my invention comprises a casing or housing 1, having a rectangular portion 2, and a substantially circular portion 3 (see Fig. 5). In the rectangular part 2, windows 4 are provided through which appear numbers 5 on charts, which are advanced by the measuring-roller of the machine, the numbers on said charts being in alinement with numbers on scales 6, indicating different prices per yard.

In the circular portion of the housing is mounted a dial 7, carrying a scale indicating yards, fractional yards and inches. The dial illustrated is capable of indicating up to 12 yards. In addition to the charts carrying the numbers 5, the indicating mechanism includes two pointers 8 and 9, the former of which is a slow-moving pointer to indicate yards, the latter being a fast-moving pointer to indicate inches. The charts referred to above are indicated in Fig. 7, by the numbers 10, and these charts normally wind upon a drum 11, their upper ends being wound upon rollers 12, just below the windows 4. The shafts 13 of the rollers 12, carry gear-wheels 14 (see Fig. 6) and when the machine is in operation these gear-wheels 14 are driven through a gear-train 15 by a pinion 16 carried by the shaft 18ª of the measuring-roller 18 (see Fig. 1); a branch gear-train includes bevel gears 17 and 18 (see Fig. 6) the latter of which drives the fast-moving pointer 9 by driving its spindle 19 (see Fig. 6). The spindle 19 operates to drive a reduction gearing 20, which drives the slow-moving pointer 8. The gear-wheels 14 are immediately driven by an idle gear 21 which meshes with them, so that they are driven at equal speed and in the same direction.

It should be understood that my improvements do not concern the mechanism described above, except that they involve hand-actuated means for driving this mechanism so that the machine can be used as a computer. In the normal operation of the machine the fabric is drawn through a gap 22 (see Fig. 7) which is located between the measuring-roller 18 and the presser-roller 23. In Fig. 7, the presser-roller carrying frame is illustrated in a raised position, that is to say, it is holding the presser-roller withdrawn from the measuring-roller 18. During a measuring operation however, the presser-roller 23 presses the fabric against the measuring-roller 18, being held down against the measuring-roller by springs such as the spring 24, which are attached to short arms 25 forming parts of the carrying frame and extending from a rock-shaft 26, an arm 27 whereof supports the presser-roller.

I shall now describe the hand-actuated mechanism or means which I employ to enable the indicating mechanism to be advanced when the machine is being used as a computer. The shaft 18ª of the measuring-roller carries a pinion 28 (see Fig. 1), that is rigid with the pinion 16 and any suitable hand-actuated means is provided for driving this pinion. In order to accomplish this, I may provide a shaft 29 (see Fig. 1) carrying a gear wheel 30. The hand-actuated means however is so arranged that it is normally disconnected from, but it may be connected at will with the pinion 28 to enable the indicating mechanism and the measuring-roller 18 to be rotated. The outer end of shaft 29 carries a head 31 which extends beyond the wall of the housing and this head may be provided with a small crank 32 having a hinge connection 33 enabling the crank to fold into the end of the head when not in use (see Figs. 4 and 4ª). If desired, a small spring 34 may be employed to assist in holding the handle 35 of the crank within the opening 36 of the head.

The means for effecting the connection or disconnection of the hand-actuated means is of the nature of a special clutch-device, and while this clutch could be controlled at will by hand, I prefer to construct it so that it is automatically controlled by a part of the mechanism, for example, the presser-roller, the relation being such that when the presser-roller 23 is elevated, or withdrawn from the measuring-roller by pressing down on the arm 51 then the clutch-device is automatically closed, that is to say, the connection is effected from the hand-actuated means or gear 30 to drive the pinion 28. In order to accomplish this, I do not permit the pinion 30 to mesh directly with the pinion 28, but I provide a small idle-gear or pinion 37 (see Fig. 3) which meshes with pinion 28 and which is mounted so that it can swing into or out of mesh with the gear wheel 30; for this purpose I prefer to employ a rocking-bracket 38 which is mounted to rock on a line coinciding with the axis of the measuring-roller shaft 18ª. For this purpose I provide a fixed horizontal stud 39 in axial alinement with the shaft 18ª, and supported in a fixed bracket 40. Rocking bracket 38 includes a rocking-plate 41 mounted to rock on this stud, and this rocking-plate 41 carries the pinion 37; it also includes mounted to rock on the stud 39, a second rocking-plate 42 carrying a pin 43 which operates as a stop to limit the movement of the rocking-plate 41 with respect to the rocking-plate 42. This pin 43 is engaged by the edge 44 of the rocking-plate 41, held up against the pin by a small coil spring 45 attached to pin 43 and to a pin 41ª on rocking-plate 41.

The presser roller may be raised by the operation of the knife that is employed for notching the edge of the fabric where it is to be cut off. The construction for effecting this will be described hereinafter.

With this organization of parts, it is evident that if the rocking-plate 42 is rocked toward the left, that is to say, in an anti-clock-wise direction, the pinion 37 will be thrown out of mesh with the gear-wheel 30, thereby disconnecting the hand-actuated means. In order to enable this to be effected automatically, the rock-shaft 26 of the presser-roller frame is formed with a neck 46 which extends through a vertical frame-plate 47 (see Fig. 1), and carries an arm 46ª which is attached by a pin 48 to a long off-set arm 49 which extends upwardly from and forms an extension of the second rocking-plate 42. The pin 48 passes through a slot 50 in the end of this arm 49 (see Fig. 3).

When the presser-roller 23 is raised, evidently the arm 46ª will swing toward the right, as viewed in Fig. 3, and this will move the pinion 37 toward the left and into mesh with the gear-wheel 30. It should be noted that this rotary movement is imparted from the second rocking-plate 42 to the first rocking-plate 41 through the spring 45; the object of this is to provide a yielding connection between the two rocking-plates, which is desirable in case the teeth of the pinion 37 should fail to mesh perfectly with the teeth of the gear-wheel 30, that is to say, if the ends only of the teeth engage, then the spring 45 will be extended, and as soon as the gear-wheel 30 commences to rotate, the pinion 37 will spring into perfect mesh with it.

In this type of machine the presser-roller is usually raised automatically when a knife K pivoted at $k$ (see Fig. 6) is operated by a thumb plate $k'$ (see Fig. 5) to mark the measured fabric at the point where it is to be cut off. For this purpose the rock-shaft 26 is provided with means for rocking it, said means being in the form of a rigid arm 51 (see Fig. 8), the end of which projects through an opening in a side plate 52 of the machine. In actual practice, this arm 51 is in the path of the knife and constitutes means for operating the presser-roller automatically by the knife. This relation however, it is unnecessary to illustrate. When this arm 51 is swung downwardly it is automatically held down by suitable means, such as a small latch 57, which is pivotally mounted at 53ª on a bracket 53 (see Fig. 1). Fig. 8 shows this latch holding down the arm, at which time the shoulder 54 on the latch engages over the upper edge of the arm. A spring 55 pulls the latch in the direction to latch the arm automatically, and the latch is further provided with a laterally extending thumb-plate 56 which can be pressed inwardly into the position in which it is shown in Fig. 1; this will extend the spring 55 and release the arm 51 from the shoulder 54 permitting the springs 24 to pull the presser-roller down onto the measuring-roller.

I shall now describe the mode of operation:

When the presser-roller is in its elevated position, withdrawn from the measuring-roller (see Fig. 7) the arm 46ª is located toward the right (see Fig. 3) and the pinion 37 is held in mesh with the gear-wheel 30.

If it is desired to actuate the indicating mechanism to ascertain the charge which should be made for any given length of fabric, this is accomplished by opening up the hinged lever or crank arm 32 into the position in which it is shown in Fig. 4ª; the crank 32 can then be operated so as to rotate the shaft 29, imparting movement to the pinion 28 and through it to the pinion 16, which movement is imparted through the gear-train 15 to the indicating mechanism. Attention is called to the fact that in connecting the hand-acuated device to the indicating mechanism in this way to actuate it, I prefer not to disconnect the measuring-roller, for the reason that by leaving the measuring-roller connected, it operates as a fly-wheel to give a steadier movement in operating the crank 32.

As stated above, if the pinion 37 should not mesh perfectly with the gear-wheel 30, it simply extends the spring 45, and as soon as the gear-wheel 30 commences to rotate, the pinion 37 will spring into perfect mesh with the gear-wheel.

It is understood that the embodiment of the invention described herein is only one of the many embodiments my invention may take, and I do not wish to be limited in the practice of my invention nor in my claims, to the particular embodiment set forth.

What I claim and desire to secure by Letters Patent is:—

1. In a machine of the class described, the combination of a measuring-roller, indicating mechanism actuated thereby, a presser-roller coöperating with said measuring-roller and movable toward and away from the measuring-roller, means for moving the presser-roller away from the measuring-roller, hand-actuated means for driving the said indicating mechanism but normally disconnected therefrom, and means actuated automatically when said presser roller is moved away from the measuring-roller for connecting the said hand-actuated means to the indicating mechanism.

2. In a machine of the class described, the combination of a measuring roller, indicating mechanism actuated thereby, a presser-roller coöperating with said measuring-roller and mounted to move toward or away from the measuring-roller, means for holding the presser roller in a withdrawn position away from said measuring-roller, hand-actuated means for driving the said measuring-roller and indicating mechanism normally disconnected therefrom, and means actuated automatically when said presser-roller is moved away from the measuring-roller for connecting said hand-actuated means to the indicating mechanism.

3. In a machine of the class described, the combination of a measuring-roller, indicating mechanism actuated thereby, a presser-roller coöperating with said measuring-roller to hold the fabric against the measuring-roller, a movable frame supporting said presser-roller, hand-actuated means for driving the said measuring-roller and the indicating mechanism, but normally diconnected therefrom, means for moving said presser-roller away from the measuring-roller, and means actuated automatically by said last named means for connecting said hand-actuated means to the indicating mechanism when the presser-roller is moved away from the measuring roller.

4. In a machine of the class described, the combination of a measuring-roller, indicating mechanism actuated thereby, a presser-roller coöperating with said measuring-roller to hold the fabric against the measuring-roller, a movable frame supporting said presser-roller, hand-actuated means for driving the said measuring-roller and the indicating mechanism, said hand-actuated means being normally disconnected from the measuring-roller and the indicating mechanism, means for moving said presser-roller away from the measuring-roller, and means actuated automatically by said last named means for connecting said hand-actuated means to the indicating mechanism and the measuring-roller when the presser-roller is moved away from the measuring-roller.

5. In a machine of the class described, the combination of a measuring-roller, indicating mechanism actuated thereby, hand-actuated means for driving the measuring-roller and the indicating mechanism normally disconnected therefrom, and a clutch device adapted to be operated at will to connect the hand-actuated means to the measuring-roller and the indicating mechanism to drive the same.

6. In a machine of the class described, the combination of a measuring-roller, indicating mechanism actuated thereby, a presser-roller coöperating with said measuring-roller to hold the fabric against the measuring-roller, a movable frame supporting said presser-roller, hand-actuated means, normally disconnected from the indicating mechanism, a clutch-device associated with said hand-actuated means, and means for moving said presser-roller away from the measuring-roller and means actuated automatically by said last named means for controlling said clutch-device to connect the hand-actuated means with the indicating mechanism and the measuring-roller when the presser roller is moved away from the measuring-roller.

7. In a machine of the class described, the combination of a measuring-roller, indicating mechanism actuated thereby, a presser-roller coöperating with said measuring-roller to hold the fabric against the measuring-roller, a movable frame including a rocker shaft supporting said presser-roller, hand-actuated means for driving the said measuring-roller and the indicating mechanism, said hand-actuated means being normally disconnected and including a gear-wheel, a rocking bracket mounted to rock on the axis of the measuring roller, a pinion rigid with the measuring-roller, an idle gear carried by said rocking bracket meshing with said pinion and adapted to mesh with said gear-wheel, and movable away from said gear-wheel by the rocking bracket, and means for connecting said rocking bracket with said rocker shaft of the presser-roller to move said idle gear into mesh with said gear-wheel automatically when the presser-roller is raised.

8. In a machine of the class described, the combination of a measuring-roller, indicating mechanism actuated thereby, a presser-roller coöperating with said measuring-roller to hold the fabric against the measuring-roller, a movable frame including a rocker shaft supporting said presser-roller, hand-actuated means for driving the said measuring-roller and the indicating mechanism normally disconnected therefrom, said hand-actuated means including a gear wheel, a rocking bracket mounted to rock on the axis of the measuring-roller, a pinion rigid with the measuring-roller, an idle gear carried by said rocking bracket meshing with said pinion and adapted to mesh with said gear wheel, and movable away from said gear wheel by the rocking movement of said rocking bracket, and means for connecting said rocking bracket with said rocker shaft of the presser-roller to move said idle gear into mesh with said gear wheel automatically when the presser-roller is raised, said rocking bracket including two plates independently rotatable on the axis of the measuring-roller, one of said plates carrying said idle gear, and a spring connecting said plates, whereby the idle gear is pulled yieldingly against said gear wheel.

9. In a machine of the class described, the combination of a measuring-roller, indicating mechanism actuated thereby, a presser-roller coöperating with said measuring-roller to hold the fabric against the measuring-roller, a movable frame including a rocker shaft supporting said presser-roller, hand actuated means for driving the said measuring-roller and the indicating mechanism, but normally disconnected therefrom, said hand-actuated means including a gear wheel, a rocking bracket mounted to rock on the axis of the measuring-roller, said rocking bracket comprising a rocking plate, an idle gear carrried thereby adapted to mesh with said gear wheel, said rocking bracket including a second rocking-plate, a pinion rigid with the measuring-roller and meshing with said idler, said second rocking-plate having an arm extending therefrom, a connection between said arm and said movable frame of said presser-roller for rocking said rocking bracket when the presser-roller is moved away from the measuring-roller, operating to swing the rocking-bracket and move said idle gear into mesh with said gear wheel, a spring connecting said second named rocking-plate and said first named rocking-plate for communicating a rocking movement to said first named rocking-plate and operating to pull the said idle gear yieldingly into mesh with said gear wheel, and a stop for limiting the movement of the first named rocking-plate on said second named rocking-plate, under the force of said spring.

10. In a machine of the class described, the combination of a measuring-roller, indicating mechanism actuated thereby, a presser-roller coöperating with said measuring-roller and mounted to move toward or away from the measuring-roller, means for holding the presser-roller in a withdrawn position away from said measuring-roller, hand-actuated means for driving the indicating mechanism, normally disconnected therefrom, and means actuated automatically when said presser-roller is moved away from the measuring-roller for connecting said hand-actuated means to the indicating mechanism.

11. In a machine of the class described, the combination of a measuring-roller, indicating mechanism actuated thereby, a presser-roller coöperating with said measuring-roller to hold the fabric against the measuring-roller, a movable frame supporting said presser-roller, hand-actuated means for driving the said indicating mechanism, normally disconnected therefrom, said hand actuated means being normally disconnected from the measuring-roller and the indicating mechanism, means for moving said presser-roller away from the measuring-roller, and means actuated automatically by said last named means for connecting said hand-actuated means to the indicating mechanism when the presser-roller is moved away from the measuring roller.

In testimony whereof I have hereunto set my hand.

DOUGLAS TURNER.